United States Patent
Yoshida et al.

(10) Patent No.: US 9,802,272 B2
(45) Date of Patent: Oct. 31, 2017

(54) LASER WELDING APPARATUS AND LASER WELDING METHOD

(71) Applicant: TOYOTA JIDOSHA KABUSHIKI KAISHA, Toyota-shi, Aichi-ken (JP)

(72) Inventors: Satoshi Yoshida, Toyota (JP); Yoichi Naruse, Nagoya (JP); Hiroyasu Kado, Seto (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 198 days.

(21) Appl. No.: 14/739,320

(22) Filed: Jun. 15, 2015

(65) Prior Publication Data

US 2015/0360320 A1 Dec. 17, 2015

(30) Foreign Application Priority Data

Jun. 16, 2014 (JP) ................................ 2014-123850

(51) Int. Cl.

| | |
|---|---|
| B23K 26/20 | (2014.01) |
| B23K 26/322 | (2014.01) |
| B23K 26/064 | (2014.01) |
| B23K 26/067 | (2006.01) |
| B23K 26/06 | (2014.01) |
| B23K 26/28 | (2014.01) |
| B23K 26/082 | (2014.01) |

(52) U.S. Cl.
CPC .......... *B23K 26/206* (2013.01); *B23K 26/064* (2015.10); *B23K 26/0608* (2013.01); *B23K 26/0643* (2013.01); *B23K 26/0676* (2013.01); *B23K 26/082* (2015.10); *B23K 26/28* (2013.01)

(58) Field of Classification Search
CPC .............. B23K 26/206; B23K 26/3226; B23K 26/0643; B23K 26/0676
USPC ............. 219/121.63, 121.64, 121.76, 121.77
See application file for complete search history.

(56) References Cited

U.S. PATENT DOCUMENTS 4,857,697 A * 8/1989 Melville ............ B23K 26/0613
 219/121.63
5,658,473 A * 8/1997 Ziemek ................... B21C 37/08
 219/121.64

(Continued)

FOREIGN PATENT DOCUMENTS

| CN | 102476242 A | 5/2012 | |
|---|---|---|---|
| DE | EP 2186594 A1 * | 5/2010 | ......... B23K 26/0604 |

(Continued)

OTHER PUBLICATIONS

Partial English Translation Communication dated Jul. 28, 2017 from the State Intellectual Property Office of the P.R.C., in counterpart Chinese application No. 201510321123.X.

*Primary Examiner* — Samuel M Heinrich
(74) *Attorney, Agent, or Firm* — Sughrue Mion, PLLC

(57) ABSTRACT

A laser welding apparatus for joining a first member and a second member together by laser welding includes: a first laser beam applying device that applies a laser beam to a border area between the first member and the second member; and a second laser beam applying device that applies a laser beam to a laser beam application spot of each of the first member and the second member, the laser beam application spot being located ahead of a laser beam application spot to which the laser beam is applied by the first laser beam applying device, in a laser welding forward direction.

9 Claims, 16 Drawing Sheets

(56) References Cited

U.S. PATENT DOCUMENTS

| | | |
|---|---|---|
| 2001/0017291 A1 | 8/2001 | Bishop |
| 2005/0056626 A1 | 3/2005 | Gross et al. |
| 2005/0098260 A1* | 5/2005 | Chen ................ B23K 26/0604 156/272.8 |
| 2005/0194363 A1* | 9/2005 | Hu ...................... B23K 26/032 219/121.64 |
| 2008/0164301 A1* | 7/2008 | Nowak ................ B23K 26/123 228/226 |
| 2010/0288738 A1* | 11/2010 | Jones ................ B23K 26/0608 219/121.63 |
| 2011/0095003 A1 | 4/2011 | Sakurai et al. |
| 2014/0124481 A1 | 5/2014 | Yano et al. |

FOREIGN PATENT DOCUMENTS

| | | | |
|---|---|---|---|
| EP | 0823304 A1 | | 2/1998 |
| JP | 10111471 A | | 4/1998 |
| JP | 11-104866 A | | 4/1999 |
| JP | 11104877 A | | 4/1999 |
| JP | 2001135282 A | | 5/2001 |
| JP | 2001-338622 A | | 12/2001 |
| JP | 2003094184 A | * | 4/2003 |
| JP | 2005-104092 A | | 4/2005 |
| JP | 2009-183970 A | | 8/2009 |
| JP | 2009269036 A | | 11/2009 |
| JP | 2011-092944 A | | 5/2011 |
| JP | 2012-110905 A | | 6/2012 |
| JP | 2012-130946 A | | 7/2012 |
| JP | 2013-220462 A | | 10/2013 |
| JP | 2014102895 A | | 6/2014 |
| KR | 2000-0075967 A | | 12/2000 |
| KR | 1020130130864 A | | 12/2013 |

\* cited by examiner

F I G . 10
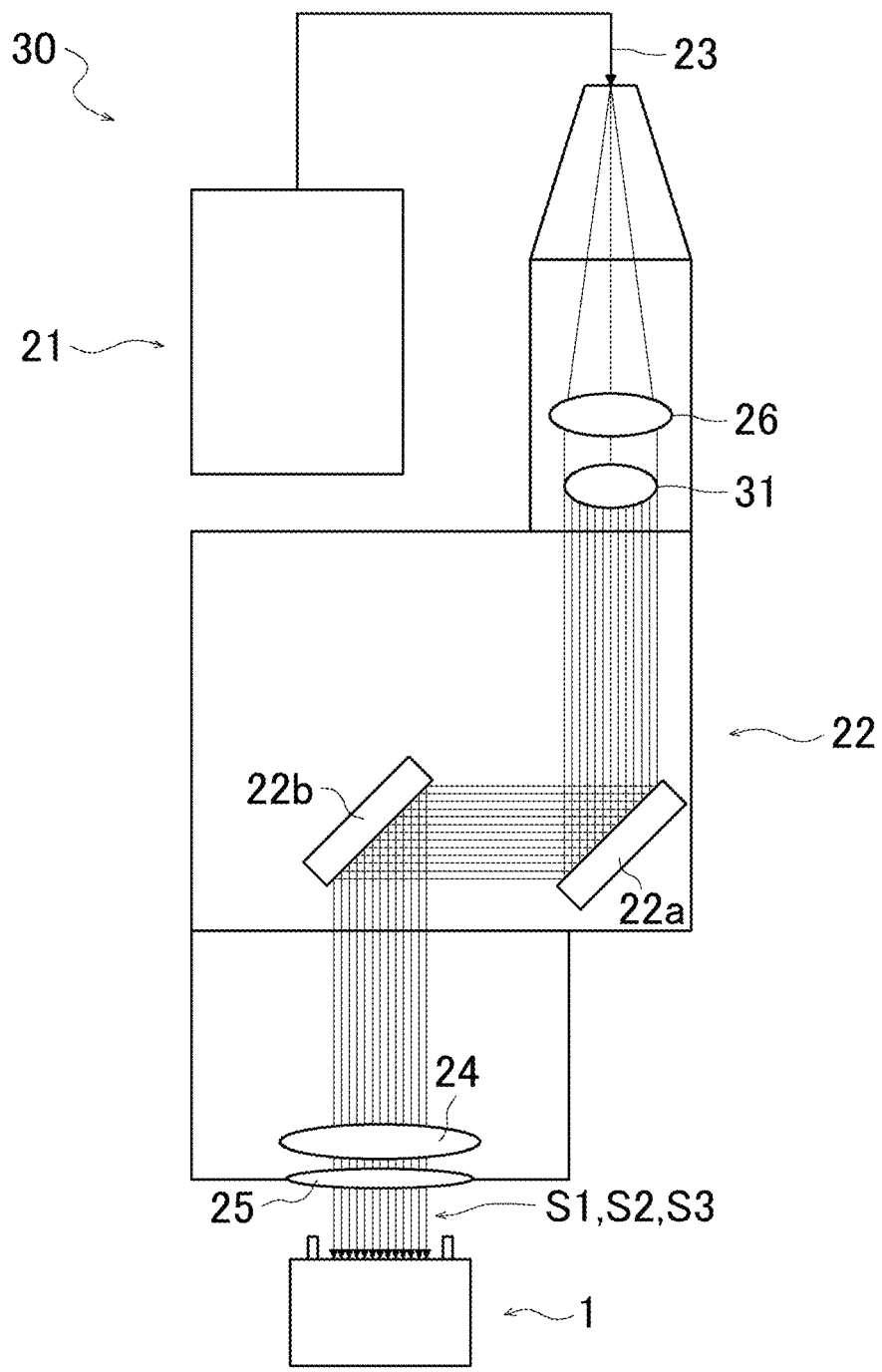

(PATTERN 1)

(PATTERN 2)

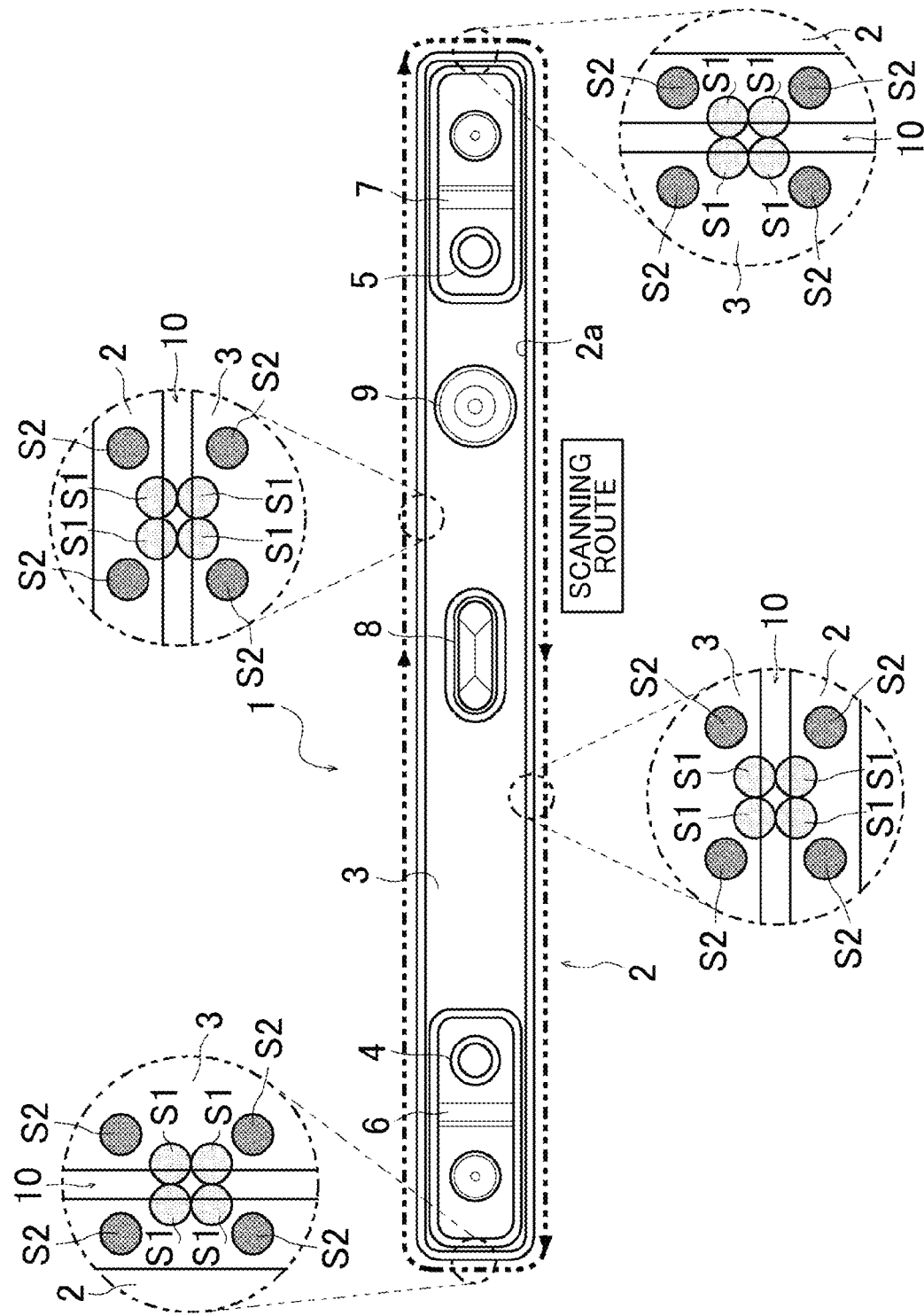

LASER WELDING APPARATUS AND LASER WELDING METHOD

INCORPORATION BY REFERENCE

The disclosure of Japanese Patent Application No. 2014-123850 filed on Jun. 16, 2015 including the specification, drawings and abstract is incorporated herein by reference in its entirety.

BACKGROUND OF THE INVENTION

1. Field of the Invention

The invention relates generally to a technology pertaining to a laser welding apparatus and a laser welding method, and more specifically to a technology for enhancing the speed of laser welding.

2. Description of Related Art

Laser welding apparatuses and laser welding methods for joining two members together by laser welding are widely used. Examples of products that are manufactured by joining two members together by the laser welding apparatuses and the laser welding methods include secondary batteries including a box-shaped battery case and a lid member. Such secondary batteries are usually manufactured by joining a lid member to an open portion of a battery case by laser welding. One example of the technology for joining a lid member to an open portion of a battery case by laser welding is described in Japanese Patent Application Publication No. 2012-110905 (JP 2012-110905 A).

With a laser welding method and a laser welding apparatus described in JP 2012-110905 A, a case (battery case) and a sealing plate (lid member) are welded together by applying a laser beam to the battery case and the lid member. The laser beam is formed of a low power density laser beam and a high power density laser beam. With the conventional laser welding method and laser welding apparatus described in JP 2012-110905 A, the low power density laser beam is applied to the battery case, the lid member and a clearance between the battery case and the lid member in whole, while the high power density laser beam is applied to a portion of each of the battery case and the lid member, which is located within the area to which the low power density laser beam is applied. The laser welding method and laser welding apparatus described in JP 2012-110905 A make it possible to stably weld the battery case and the lid member together with high quality.

The low power density laser beam, which is used in the laser welding method and laser welding apparatus described in JP 2012-110905 A, is applied in order to avoid abrupt temperature changes due to the high power density laser beam. Thus, the intensity of the low power density laser beam is not high enough to melt and evaporate the material. For this reason, with the conventional laser welding method and laser welding apparatus, it takes a long time for molten material to flow into the clearance. Consequently, with the conventional laser welding method and laser welding apparatus, it takes a long time to fill the clearance with the molten material. Thus, an increase in the laser beam (high power density laser beam) scanning speed may result in entrance of the laser beam into the clearance. Note that, in the following description, a phenomenon, in which a laser beam enters a clearance between two members that constitute a workpiece subjected to welding and then the laser beam reaches the inside or back side of the workpiece, will be referred to as laser beam penetration.

In the case where the laser welding method and laser welding apparatus described in JP 2012-110905 A are employed, when the inside or back side of a workpiece subjected to welding is provided with a part that should be protected, it is necessary to set the welding speed to a speed at which laser beam penetration does not occur. This makes it difficult to enhance the speed of laser welding. In view of this, there has been a demand for development of a technology pertaining to a laser welding apparatus and a laser welding method, which makes it possible to enhance the speed of laser welding that is performed to join two members together while avoiding occurrence of laser beam penetration.

SUMMARY OF THE INVENTION

The invention provides a laser welding apparatus and a laser welding method that make it possible to enhance the speed of laser welding by inhibiting laser beams from entering a clearance between two members to be joined together by laser welding.

A first aspect of the invention relates to a laser welding apparatus for joining a first member and a second member together by laser welding. The laser welding apparatus includes: a first laser beam applying device that applies a laser beam to a border area between the first member and the second member; and a second laser beam applying device that applies a laser beam to a laser beam application spot of each of the first member and the second member, the laser beam application spot being located ahead of a laser beam application spot to which the laser beam is applied by the first laser beam applying device, in a laser welding forward direction.

According to the first aspect, it is possible to fill a clearance between the first member and the second member with the material melted by the laser beam applied by the second laser beam applying device, thereby inhibiting the laser beam applied by the first laser beam applying device from passing through the clearance. Thus, even when the speed of laser welding is increased, occurrence of laser beam penetration is avoided.

The laser welding apparatus according to the first aspect may further include a third laser beam applying device that applies a laser beam to a laser beam application spot of each of the first member and the second member, the laser beam application spot being located ahead of the laser beam application spot to which the laser beam is applied by the first laser beam applying device, in the laser welding forward direction, and being located behind the laser beam application spot to which the laser beam is applied by the second laser beam applying device, in the laser welding forward direction.

With this configuration, the material is melted sufficiently by the laser beam applied by the third laser beam applying device. Thus, it is possible to ensure a sufficient depth of fusion while enhancing the speed of laser welding.

The laser welding apparatus according to the first aspect may further include: a single laser beam source; and a diffractive-optical element. The first laser beam applying device and the second laser beam applying device may be integrated into a single laser beam applying device that serves as both the first laser beam applying device and the second laser beam applying device, due to provision of the single laser beam source and the diffractive-optical element.

With this configuration, the speed of laser welding is enhanced with the simply-configured laser welding apparatus.

The laser welding apparatus according to the first aspect may further include: a single laser beam source; and a diffractive-optical element. The first laser beam applying device, the second laser beam applying device and the third laser beam applying device may be integrated into a single laser beam applying device that serves as the first laser beam applying device, the second laser beam applying device and the third laser beam applying device, due to provision of the single laser beam source and the diffractive-optical element.

With this configuration, the speed of laser welding is enhanced with the simply-configured laser welding apparatus.

A second aspect of the invention relates to a laser welding method for joining a first member and a second member together by laser welding. The laser welding method includes: a first laser beam application step of applying a laser beam to a border area between the first member and the second member; and a second laser beam application step of applying a laser beam to a laser beam application spot of each of the first member and the second member, the laser beam application spot being located ahead of a laser beam application spot to which the laser beam is applied in the first laser beam application step, in a laser welding forward direction.

According to the second aspect, it is possible to fill a clearance between the first member and the second member with the material melted in the second laser beam application step, thereby inhibiting the laser beam applied in the first laser beam application step from passing through the clearance. Thus, even when the speed of laser welding is enhanced, occurrence of laser beam penetration is avoided.

The laser welding method according to the second aspect may further include a third laser beam application step of applying a laser beam to a laser beam application spot of each of the first member and the second member, the laser beam application spot being located ahead of the laser beam application spot to which the laser beam is applied in the first laser beam application step, in the laser welding forward direction, and being located behind the laser beam application spot to which the laser beam is applied by the second laser beam application step, in the laser welding forward direction.

With this configuration, the material is melted sufficiently in the third laser beam application step. Thus, it is possible to ensure a sufficient depth of fusion while enhancing the speed of laser welding.

In the second aspect, when there is a portion on which laser welding is performed while the laser welding forward direction is turned 90 degrees, an application pattern of the laser beam in the first laser beam application step and the laser beam in the second laser beam application step may be configured to be symmetric with respect to a line extending in the laser welding forward direction and to be symmetric with respect to a line perpendicular to the line extending in the laser welding forward direction. Also, when there is a portion on which laser welding is performed while the laser welding forward direction is turned 90 degrees, an application pattern of the laser beam in the first laser beam application step, the laser beam in the second laser beam application step, and the laser beam in the third laser beam application step may be configured to be symmetric with respect to a line extending in the laser welding forward direction and to be symmetric with respect to a line perpendicular to the line extending in the laser welding forward direction.

According to the above aspect, the speed of laser welding is enhanced with the simple method.

In the second aspect, the first member may be a battery case and the second member may be a lid member. In a case where the lid member is welded to an open portion of the battery case to seal the open portion, at least a corner portion of the open portion may be provided with a support portion that supports the lid member while sealing a clearance between the battery case and the lid member.

According to the second aspect, laser beam penetration at the corner portion is avoided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1A and FIG. 1B are views illustrating a secondary battery, which is an example of a workpiece subjected to laser welding, wherein FIG. 1A is a schematic perspective view and FIG. 1B is a schematic plan view;

FIG. 3A and FIG. 3B are schematic views illustrating arrangement of members before welding at the corner portion of the secondary battery, wherein FIG. 3A is a schematic partial plan view and FIG. 3B is a schematic partial sectional view;

FIG. 4A and FIG. 4B are views illustrating laser beam application patterns formed by a laser welding apparatus and a laser welding method according to an embodiment of the invention, wherein FIG. 4A illustrates a laser beam application pattern formed of main laser beams and sub-laser beams, and FIG. 4B illustrates a laser beam application pattern formed of a main laser beam, sub-laser beams, and additional laser beams;

FIG. 5A and FIG. 5B are schematic partial plan views each illustrating a state of laser beam application on a secondary battery, wherein FIG. 5A illustrates a state of laser beam application performed by the laser welding apparatus and laser welding method according to the embodiment of the invention, and FIG. 5B illustrates a state of laser beam application performed by a laser welding apparatus and a laser welding method according to related art;

FIG. 6A and FIG. 6B are schematic plan views each illustrating a state of formation of each evaporation portion during laser welding performed on a secondary battery, wherein FIG. 6A illustrates a case where laser welding is performed by the laser welding apparatus and laser welding method according to the embodiment of the invention, and FIG. 6B illustrates a case where laser welding is performed by a laser welding apparatus and a laser welding method according to related art;

FIG. 7A and FIG. 7B are schematic partial sectional views each illustrating a state of laser beam application on a secondary battery, wherein FIG. 7A illustrates a case where laser welding is performed by the laser welding apparatus and laser welding method according to the embodiment of the invention, and FIG. 7B illustrates a case where laser welding is performed by the laser welding apparatus and laser welding method according to the related art;

FIG. 10 is a schematic view illustrating a laser beam applying device (including a diffractive-optical element) that constitutes a laser welding apparatus according to a second embodiment of the invention;

FIG. 11A and FIG. 11B are views illustrating laser beam application patterns formed by the laser welding apparatus and laser welding method according to the embodiment of the invention, wherein FIG. 11A is a view illustrating Pattern 1 and FIG. 11B is a view illustrating Pattern 2;

FIG. 12A and FIG. 12B are views illustrating laser beam application patterns formed by the laser welding apparatus and laser welding method according to the embodiment of the invention, wherein FIG. 12A is a view illustrating Pattern 3 and FIG. 12B is a view illustrating Pattern 4;

FIG. 13A and FIG. 13B are views illustrating laser beam application patterns formed by the laser welding apparatus and laser welding method according to the embodiment of the invention, wherein FIG. 13A is a view illustrating Pattern 5 and FIG. 13B is a view illustrating Pattern 6;

FIG. 14 is a schematic plan view illustrating a state of laser welding performed by the laser welding method according to the embodiment of the invention;

FIG. 15A and FIG. 15B are schematic views illustrating a state of laser welding performed on the corner portion by the laser welding apparatus and laser welding method according to the embodiment of the invention, wherein FIG. 15A is a schematic partial plan view and FIG. 15B is a schematic partial sectional view; and FIG. 16A and FIG. 16B are schematic views illustrating a state of inhibition of occurrence of laser beam penetration, wherein FIG. 16A illustrates a case where a support portion is provided and FIG. 16B illustrates a case where no support portion is provided.

DETAILED DESCRIPTION OF EMBODIMENTS

Hereinafter, example embodiments of the invention will be described. First, with reference to FIG. 1A, FIG. 1B, FIG. 2, FIG. 3A and FIG. 3B, description will be provided on the configuration of a secondary battery, which is subjected to welding performed by a laser welding apparatus and a laser welding method according to an embodiment of the invention.

Figure 1A:
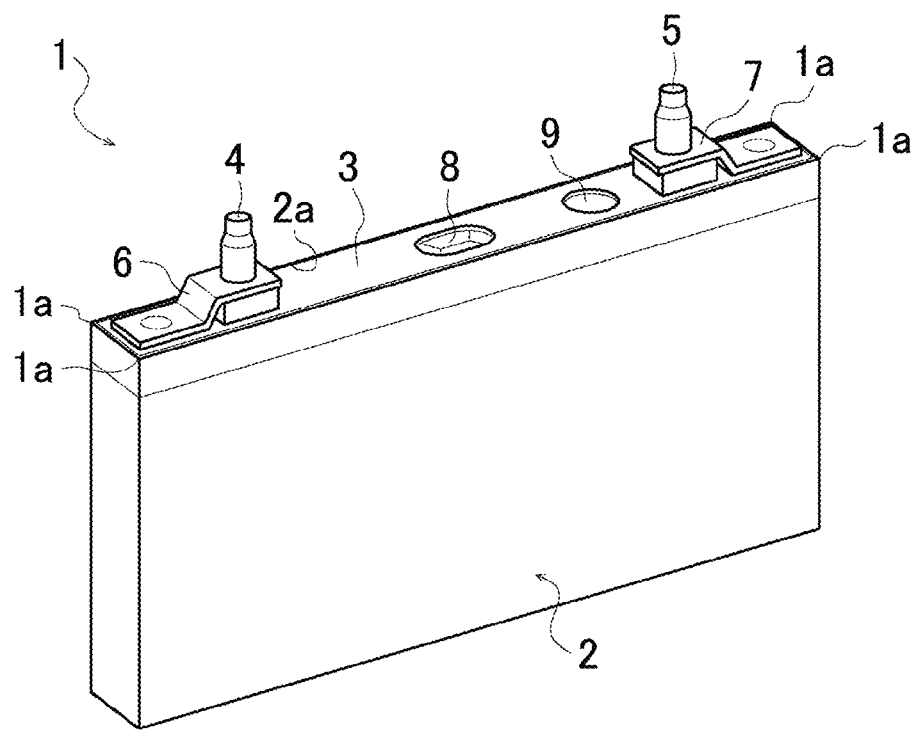
Figure 1B:
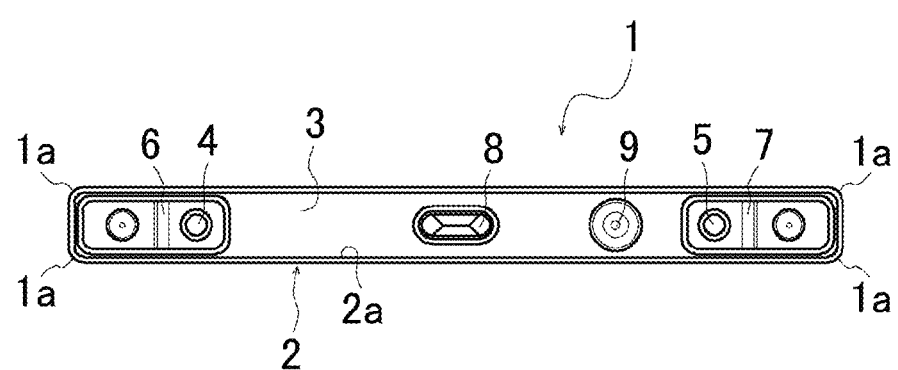

As illustrated in FIG. 1A and FIG. 1B, a secondary battery 1 includes a battery case 2, a lid member 3, a positive electrode terminal 4 and a negative electrode terminal 5. The secondary battery 1 is manufactured by laser welding performed by the laser welding apparatus and laser welding method according to the embodiment of the invention.

The battery case 2 is a generally rectangular parallelepiped container in which an electrode body (not illustrated) and an electrolyte solution (not illustrated) are housed. The battery case 2 is open at one side thereof, so that an open portion 2a is formed. The lid member 3 is in the form of a plate, and used to seal the open portion 2a of the battery case 2. The lid member 3 has an outer shape that substantially conforms to the shape of an inner peripheral portion of the open portion 2a. Further, the size of the lid member 3 is slightly smaller than the size of the open portion 2a, so that the lid member 3 is accommodated in the open portion 2a. The battery case 2 and the lid member 3 that constitute the secondary battery 1 in the embodiment are both made of aluminum.

The secondary battery 1 includes the positive electrode terminal 4 and the negative electrode terminal 5 that protrude outward from the lid member 3. The positive electrode terminal 4 is electrically connected to a positive electrode (not illustrated) of the electrode body via a metal piece 6, and the negative electrode terminal 5 is electrically connected to a negative electrode (not illustrated) of the electrode body via a metal piece 7. The lid member 3 of the secondary battery 1 has a safety valve 8 and a liquid supply port 9.

Figure 2:
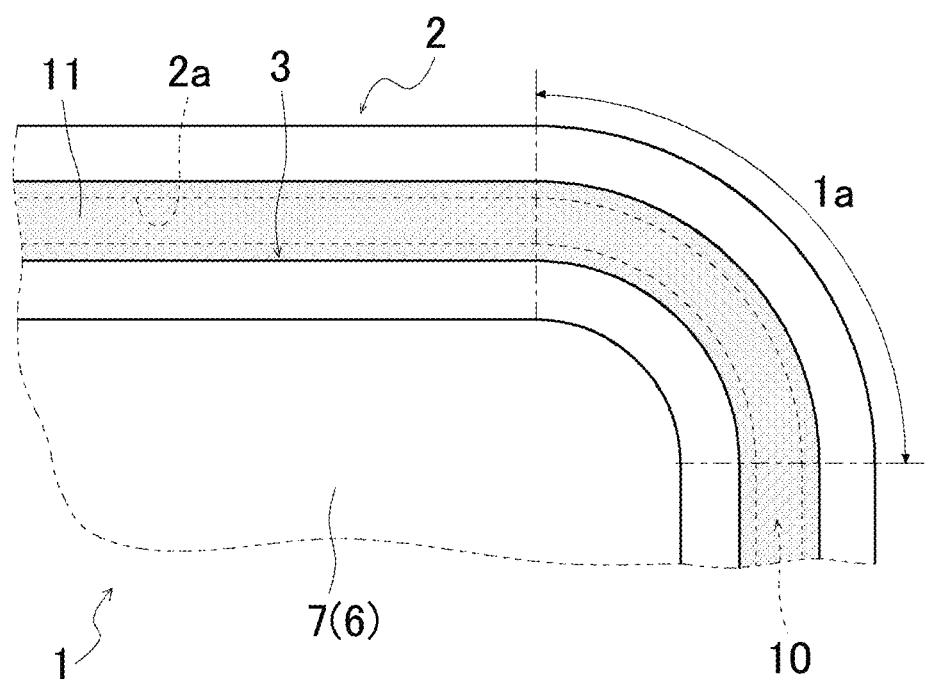
FIG. 2 is a schematic partial plan view illustrating a state of laser welding at a corner portion of the secondary battery.

As illustrated in FIG. 2, when the lid member 3 is disposed in the open portion 2a of the battery case 2, a clearance 10 is formed between the open portion 2a and the lid member 3. The clearance 10 is formed due to the dimensional difference between the battery case 2 and the lid member 3. In the secondary battery 1 in the embodiment, the clearance 10 is a small clearance of 0.5 mm or less. The secondary battery 1 is manufactured by joining two members, that is, the battery case 2 and the lid member 3, together by laser welding, thereby sealing the open portion 2a with the lid member 3. In the secondary battery 1 obtained after completion of laser welding, the clearance 10 is sealed with a bead 11 that has flowed into the clearance 10 and its surrounding area.

Laser welding is performed along the direction in which the clearance 10 extends, and the secondary battery 1 has corner portions 1a. Thus, when each corner portion 1a is subjected to laser welding, the direction in which laser welding proceeds (hereinafter, referred to as "laser welding forward direction") is turned 90 degrees between opposite ends of the corner portion 1a (i.e., an angle of 90 degrees is formed between the laser welding forward direction at one end of the corner portion 1a and the laser welding forward direction at the other end of the corner portion 1a). In the embodiment, the clearance 10 has a rounded shape at each corner portion 1a. However, the shape of each corner portion 1a of the secondary battery 1 need not be a rounded shape. Although one corner portion 1a of the secondary battery 1 is illustrated in FIG. 2, the secondary battery 1 has a total of four corner portions 1a defined at four respective corners of the secondary battery 1 in a plan view, as illustrated in FIG. 1A and FIG. 1B.

Figure 3A:
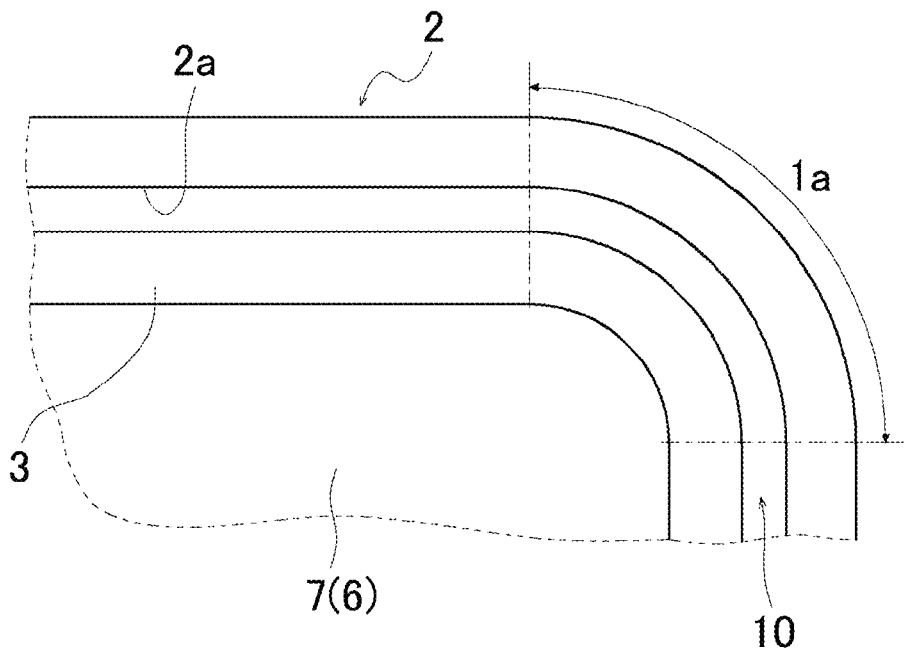
Figure 3B:
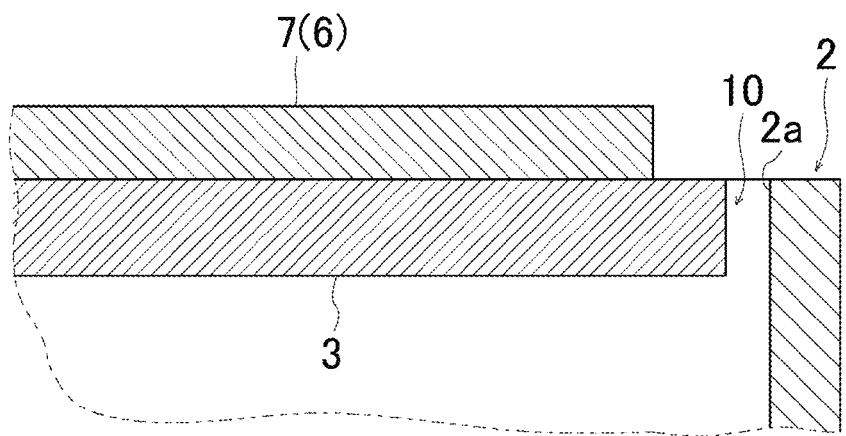

FIG. 3A and FIG. 3B illustrate the arrangement of the battery case 2 and the lid member 3 before the corner portion 1a is subjected to laser welding. There is the clearance 10 between the battery case 2 and the lid member 3 before laser welding. Thus, when a laser beam is applied to the clearance 10, laser beam penetration (a phenomenon in which the laser beam reaches the inside of the battery case 2) may occur and thus the laser beam may give a damage to the electrode body (not illustrated) housed in the battery case 2.

In view of this, the laser welding apparatus and laser welding method according to the embodiment of the invention are formulated as a technology for manufacturing the secondary battery 1 by joining two members, that is, the battery case 2 and the lid member 3, together by laser welding, while avoiding occurrence of laser beam penetration. In the embodiment, two members to be joined together by the laser welding apparatus and the laser welding method are the battery case 2 and the lid member 3 that constitute the secondary battery 1. However, the workpieces to which the laser welding apparatus and laser welding method according to the invention are applied are not limited to secondary batteries. The laser welding apparatus and laser welding method according to the invention may be widely applied to various kinds of workpieces that are manufactured by joining two members together by laser welding.

Figure 4A:
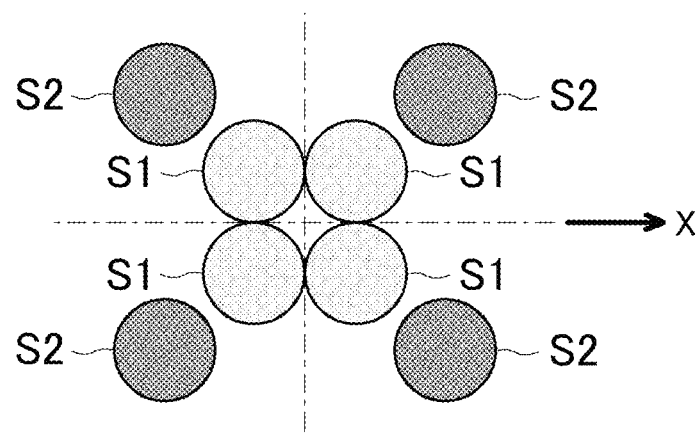

Next, laser beam application patterns that are formed by the laser welding apparatus and laser welding method according to the embodiment of the invention will be described with reference to FIG. 4A, FIG. 4B, FIG. 5A, FIG. 5B, FIG. 6A, FIG. 6B, FIG. 7A and FIG. 7B. In the laser welding apparatus and laser welding method according to the embodiment of the invention, laser beam applying devices apply laser beams in a laser beam application pattern formed of a combination of at least main laser beams S1 and sub-laser beams S2 as illustrated in FIG. 4A, thereby performing laser welding.

The main laser beams S1 are main laser beams that are applied in order to sufficiently melt the material with the heat applied by the main laser beams S1 thereby ensuring a required depth of fusion. The sub-laser beams S2 include laser beams that are applied to spots located ahead of the spots to which the main laser beams S1 are applied (hereinafter, referred to as "application spots of the main laser beams S1"), in a laser welding forward direction X.

Figure 5A:
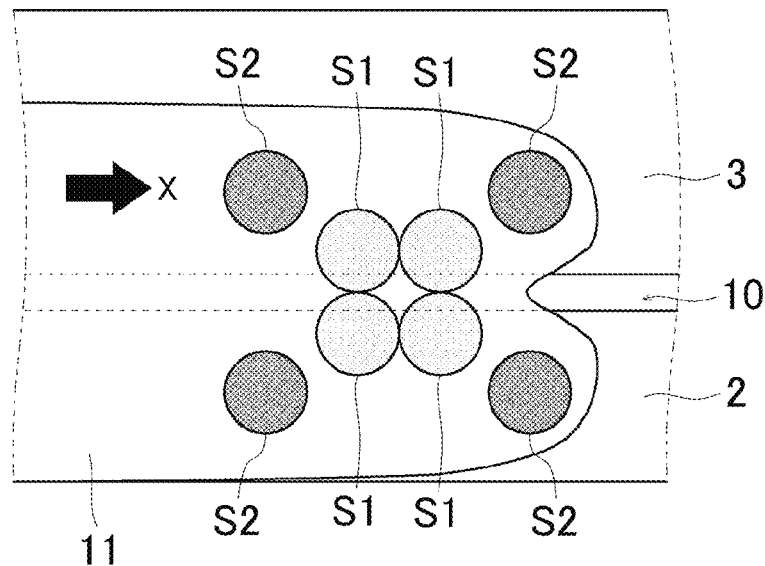

As illustrated in FIG. 5A, the main laser beams S1 are applied to be aimed at the clearance 10, which is a border area between the battery case 2 and the lid member 3. Thus, the material around the clearance 10 is sufficiently melted with the heat applied by the main laser beams S1, so that a required depth of fusion of the material around the clearance 10 is ensured.

The sub-laser beams S2 are applied to the spots ahead of the application spots of the main laser beams S1 in the laser welding forward direction X. The sub-laser beams S2 are applied in order to supply the molten material into a portion of the clearance 10, which is located ahead of the application spots of the main laser beams S1 in the laser welding forward direction X. The material around the clearance 10 is melted by the sub-laser beams S2.

Figure 5B:
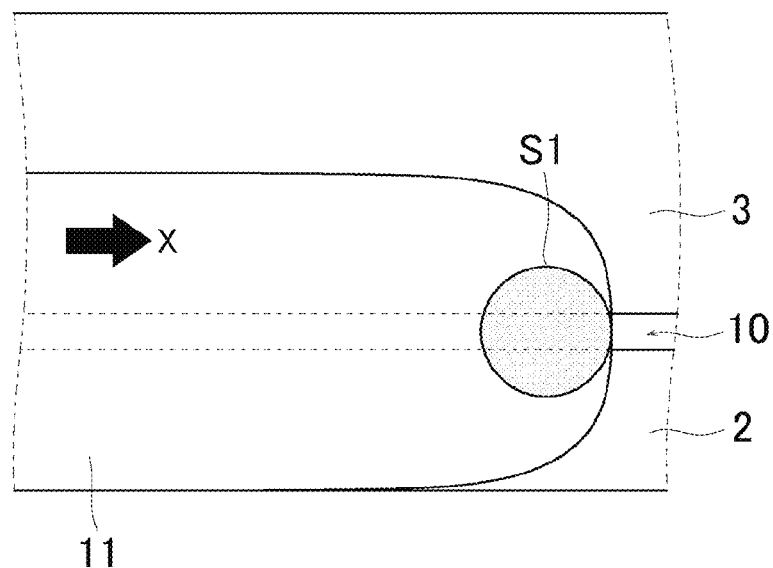

FIG. 5B illustrates a laser beam application pattern formed by a conventional laser welding apparatus and a conventional laser welding method. As illustrated in FIG. 5B, the laser beam application pattern formed by the conventional laser welding apparatus and laser welding method is formed only of a main laser beam S1. With this application pattern, laser welding is performed as follows. The main laser beam S1 is applied to a spot that overlaps with the clearance 10. Only after the material melted by the main laser beam S1 flows into the clearance 10, the application spot of the main laser beam S1 is shifted ahead in the laser welding forward direction X. In the conventional application pattern, the main laser beam S1 is located at the leading end of the bead 11 formed by laser welding. Thus, an increase in the speed of laser welding (i.e., the speed of shifting the application spot of the main laser beam S1) may result in entrance of the laser beam S1 into the clearance 10.

On the other hand, with the laser welding apparatus and laser welding method according to the embodiment of the invention, laser beams are applied in the laser beam application pattern as illustrated in FIG. 4A and FIG. 5A. This makes it possible to melt the battery case 2 and the lid member 3 by the sub-laser beams S2, at spots ahead of the application spots of the main laser beams S1 in the laser welding forward direction X, and makes it possible to supply the molten material into the clearance 10, thereby filling the clearance 10 with the molten material. As described above, in the laser welding apparatus and laser welding method according to the embodiment of the invention, the laser beam application pattern formed of a combination of the main laser beams S1 and the sub-laser beams S2 is employed. Thus, it is possible to inhibit the laser beams from entering the clearance 10 (laser beam penetration), thereby enhancing the speed of laser welding.

In the laser welding apparatus and laser welding method according to the embodiment of the invention, preferably, the sub-laser beams S2 are further applied to the material located behind the application spots of the main laser beams S1 in the laser welding forward direction X, as illustrated in FIG. 4A.

Figure 6A:
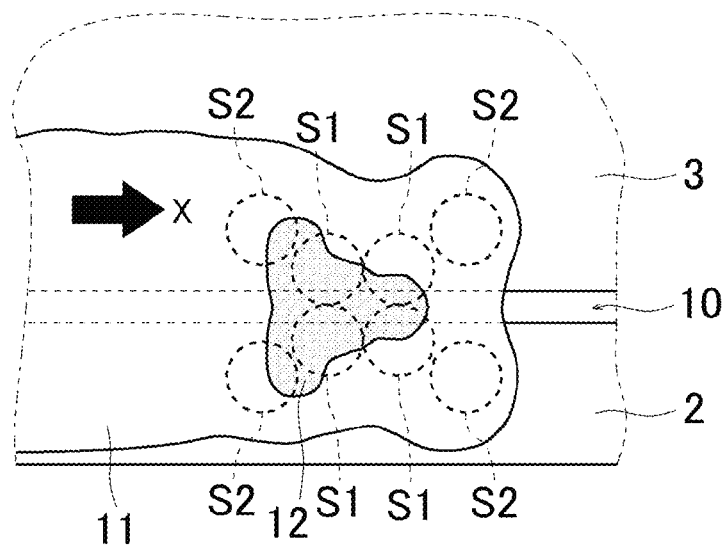
Figure 6B:
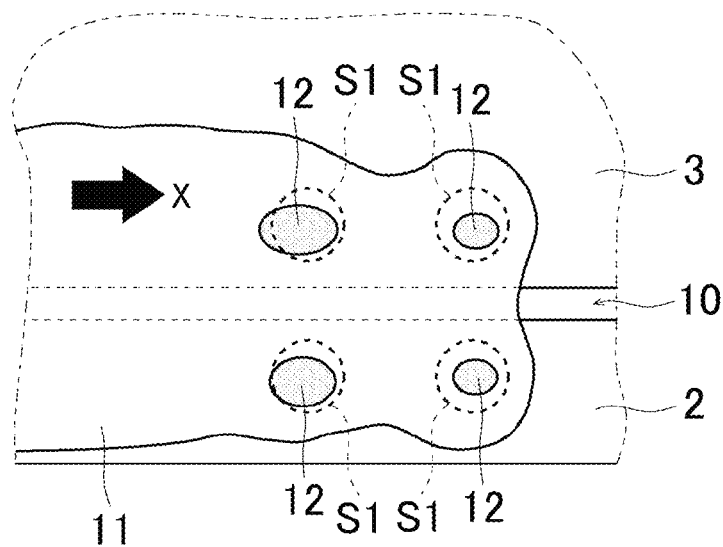
Figure 7A:
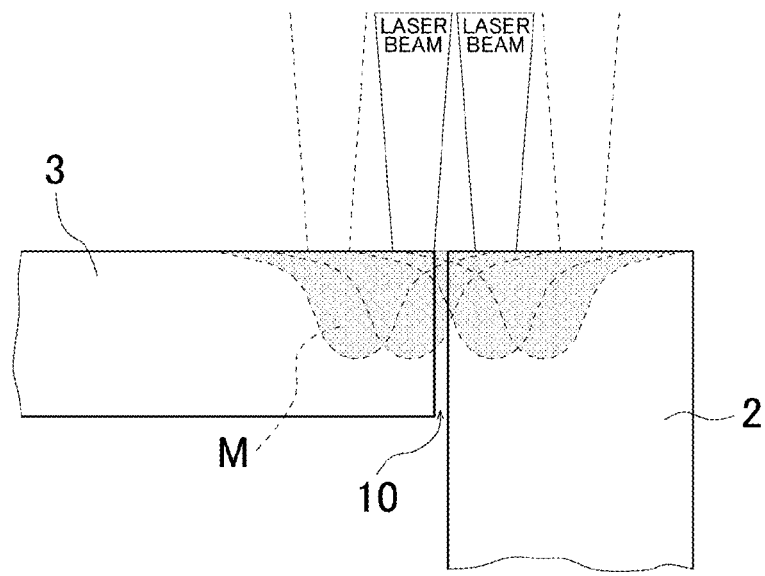
Figure 7B:
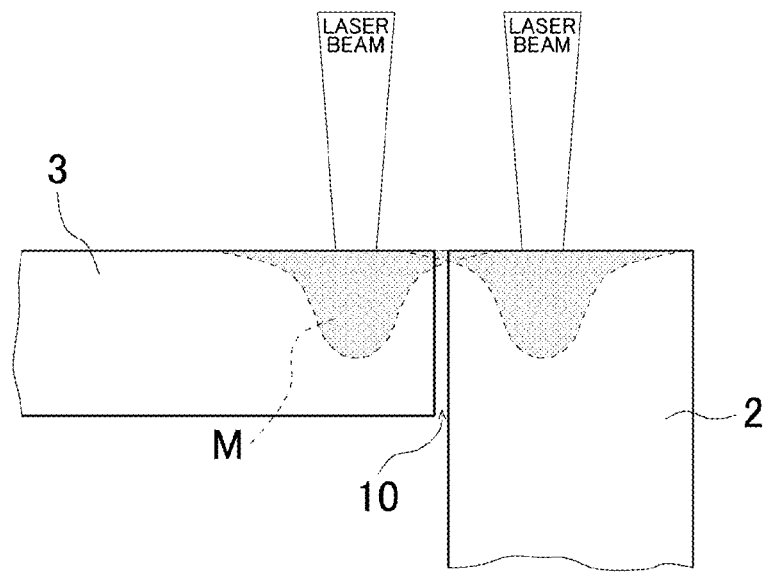

With the conventional laser welding apparatus and laser welding method, when the main laser beams S1 are applied to be aimed at the clearance 10, laser beam penetration may occur. Thus, multiple main laser beams S1 are applied to spots apart from the clearance 10 as illustrated in FIG. 6B and FIG. 7B in some cases. In this case, as illustrated in FIG. 6B, multiple evaporation portions 12 are formed at positions apart from each other. Thus, it is not possible to ensure a sufficient depth of a material fused portion M around the clearance 10.

On the other hand, in the laser welding apparatus and laser welding method according to the embodiment of the invention, the main laser beams S1 are applied onto the clearance 10 and the sub-laser beams S2 are applied to the spots behind the application spots of the main laser beams S1 in the laser welding forward direction X. In this way, a continuous evaporation portion 12 is formed over a wide area as illustrated in FIG. 6A. Further, by applying the sub-laser beams S2 to the spots behind the application spots of the main laser beams S1 in the laser welding forward direction X, it is possible to ensure a sufficient depth of the material fused portion M around the clearance 10, as illustrated in FIG. 7A. With the laser welding apparatus and laser welding method according to the embodiment of the invention, welding quality is improved by applying the sub-laser beams S2 to the spots behind the application spots of the main laser beams S1 in the laser welding forward direction X.

Figure 4B:
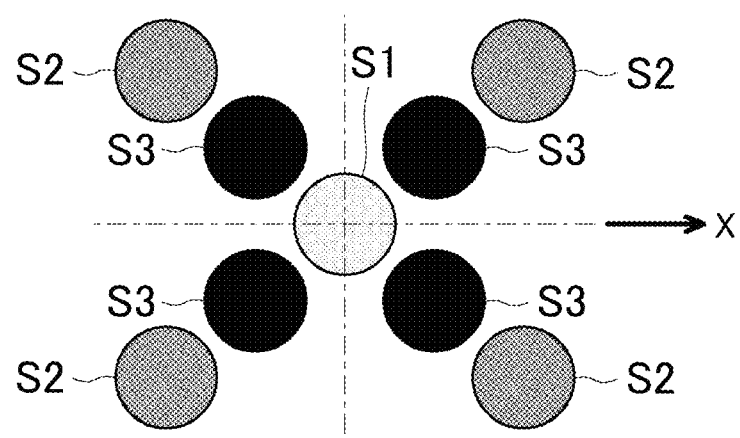

In the laser welding apparatus and laser welding method according to the embodiment of the invention, preferably, additional laser beams S3 are applied in addition to the main laser beam S1 and the sub-laser beams S2 as illustrated in FIG. 4B.

The additional laser beams S3 are laser beams that are applied so that the evaporation portions 12 formed by the main laser beam S1 and the sub-laser beams S2 are more reliably made continuous with each other. The additional laser beams S3 are applied to be aimed at spots between the application spot of the main laser beam S1 and the application spots of the sub-laser beams S2. Preferably, the intensity of each additional laser beam S3 is substantially equal to that of each sub-laser beam S2.

Laser welding has the following characteristic. A portion that has been melted by laser beam application is higher in energy absorption rate than a portion that has not been melted. Thus, applying a laser beam to the molten portion promotes laser welding more efficiently. In view of this, when the application spots of the laser beams S1, S2, S3 are made continuous with each other by applying the additional laser beams S3 to the spots between application spots of the sub-laser beams S2 and the application spot of the main laser beam S1, the entirety of the application spots of the laser beams is maintained at a high temperature, so that the energy absorption rate is increased. As a result, the material is melted efficiently in a shorter time. With the laser welding apparatus and laser welding method according to the embodiment of the invention, application of the additional laser beams S3 shortens the time required to melt the material, so that the speed of laser welding is further enhanced. In addition, a sufficient depth of fusion is ensured, so that the welding quality is further improved. In this specification, the state in which "the application spots of the laser beams S1, S2, S3 are made continuous with each other" means a state in which the application spots of the laser beams S1, S2, S3 are so close to each other that the evaporation portions 12 formed in the material as a result of laser beam application become continuous with each other. In other words, the application spots of the laser beams S1, S2, S3 need not be in contact with each other.

Next, a laser welding apparatus according to a first embodiment of the invention will be described with reference to FIG. 8 and FIG. 9. The laser welding apparatus according to the embodiment of the invention is an apparatus for joining two members together by performing laser welding, and includes laser beam applying devices that apply laser beams. The laser welding apparatus is configured to apply laser beams, for example, in the laser beam application pattern illustrated in FIG. 4A, by using a plurality of laser beam applying devices at the same time.

Figure 8:
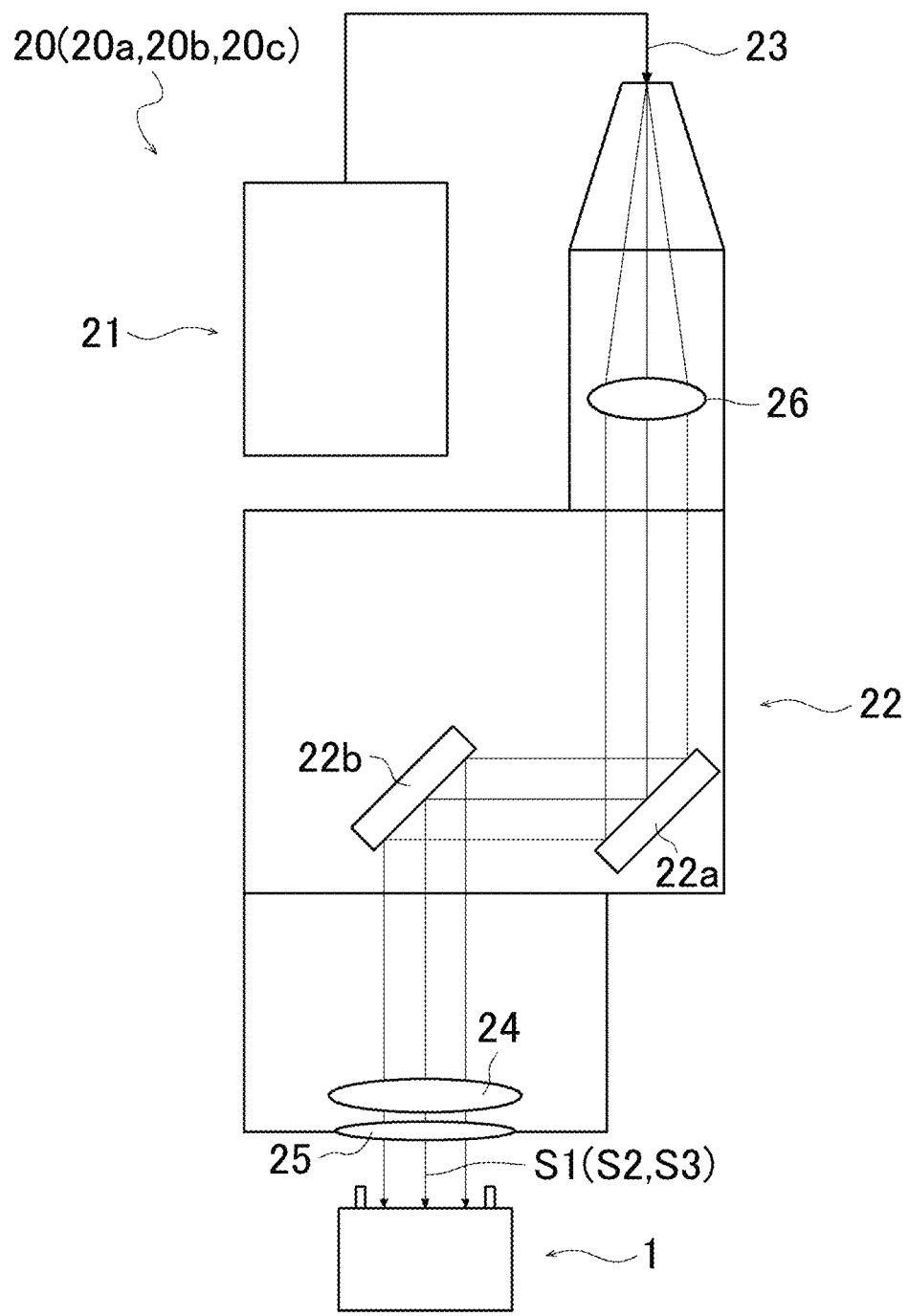
FIG. 8 is a schematic view illustrating one of laser beam applying devices that constitute a laser welding apparatus according to a first embodiment of the invention.
Figure 9:
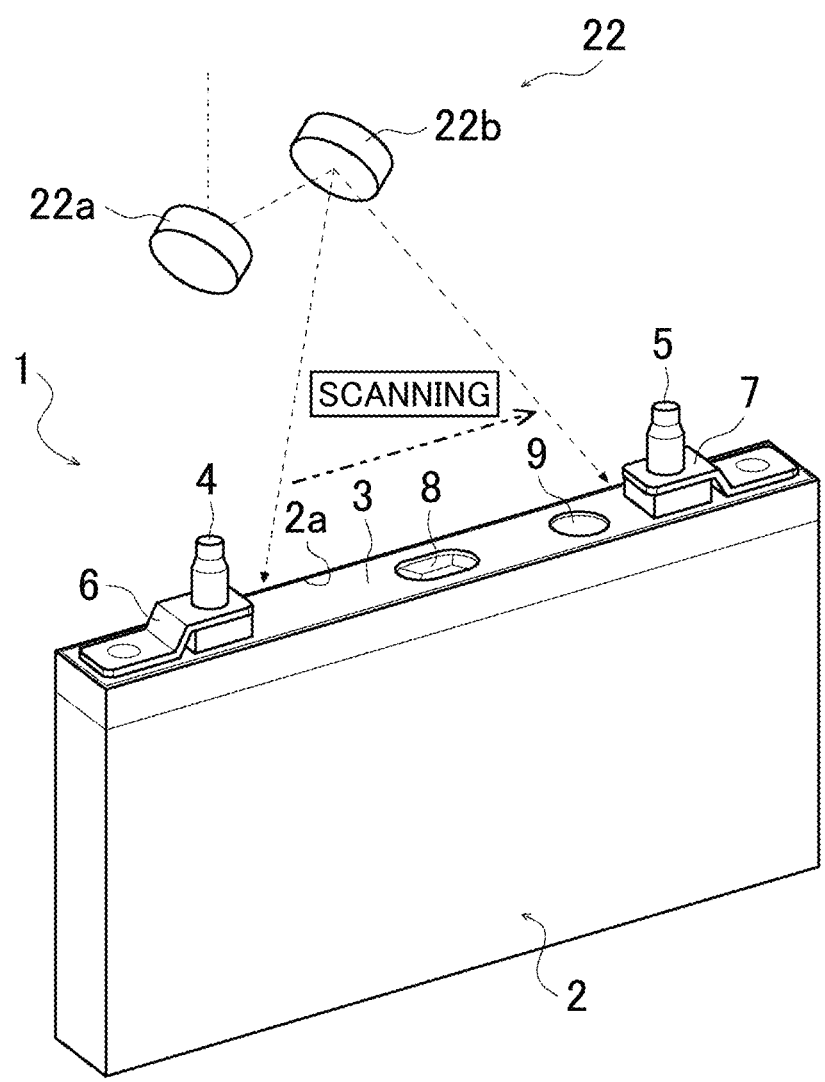
FIG. 9 is a schematic perspective view illustrating a state of laser beam application on the secondary battery performed by the laser welding apparatus according to the embodiment of the invention.

FIG. 8 illustrates a laser beam applying device 20 according to the first embodiment of the invention. The laser beam applying device 20 includes a laser oscillator 21, a galvano scanner 22, and an optical fiber 23. A laser beam emitted from the laser oscillator 21 enters the galvano scanner 22 through the optical fiber 23.

The galvano scanner 22 is a device for performing laser beam scanning over accurate positions at high speed, and includes a pair of reflecting mirrors (galvano mirrors) 22a, 22b. Each of the reflecting mirrors 22a, 22b is supported on a motor shaft (not illustrated). The galvano scanner 22 is a device that realizes high-speed laser beam scanning by driving a motor to change the reflection angle of each of the reflecting mirrors 22a, 22b at high speed. A collimator lens 26 is disposed on the input side of the galvano scanner 22. The collimator lens 26 is a lens that turns the received light beams (laser beams) into parallel light beams and sends the parallel light beams to the reflecting mirrors (galvano mirrors) 22a, 22b.

An Fθ lens 24 and a protective lens 25 are disposed on the output side of the galvano scanner 22. The Fθ lens 24 is a lens that corrects the laser beam scanning speed such that the laser beam scanning speed becomes constant.

The laser beam applying device 20 is configured such that laser beams are reflected on the reflecting mirrors 22a, 22b of the galvano scanner 22 while the angles of the reflecting mirrors 22a, 22b are changed independently from each other. Thus, the laser beam scanning is performed on the secondary battery 1 while the scanning speed is corrected by the Fθ lens 24. In this way, as illustrated in FIG. 9, the laser beams are applied to a welding portion of the secondary battery 1 (i.e., along the clearance 10) while being accurately positioned with respect to the welding portion of the secondary battery 1.

Laser beam applying devices 20 with different specifications are prepared so that different kinds of laser beams are applied from the laser beam applying devices 20. The laser welding apparatus according to the embodiment of the invention includes at least the first laser beam applying device 20a, which is a first laser beam applying device 20 that applies the main laser beam S1, and the second laser beam applying device 20b, which is a second laser beam applying device 20 that applies the sub-laser beam S2. Preferably, the laser welding apparatus according to the embodiment of the invention further includes the third laser beam applying device 20c, which is a third laser beam applying device 20 that applies the additional laser beam S3, in addition to the first laser beam applying device 20a and the second laser beam applying device 20b.

In order to form, for example, the laser beam application pattern as illustrated in FIG. 4A, multiple (eight in total, in the example in FIG. 4A) laser beam applying devices 20a, 20b are combined with each other to constitute the laser welding apparatus, and laser beams are applied to the application spots of the main laser beams S1 by the first laser beam applying devices 20a, while laser beams are applied to the application spots of the sub-laser beams S2 by the second laser beam applying devices 20b.

In order to form, for example, the laser beam application pattern as illustrated in FIG. 4B, the third laser beam applying devices 20c are additionally provided, and multiple (nine in total, in the example in FIG. 4B) laser beam applying devices 20a, 20b, 20c are combined with each other to constitute the laser welding apparatus, and laser beams are applied to the application spots of the additional laser beams S3 by the third laser beam applying devices 20c.

Specifically, the laser welding apparatus according to the first embodiment of the invention is an apparatus that joins the battery case 2, which is an example of a first member, and the lid member 3, which is an example of a second member, together by performing laser welding. The laser welding apparatus includes the first laser beam applying device 20a and the second laser beam applying devices 20b. The first laser beam applying device 20a is the laser beam applying device 20 that applies a laser beam to the clearance 10, that is, the border area between the battery case 2 and the lid member 3. The second laser beam applying devices 20b are the laser beam applying devices 20 that apply laser beams to spots on the battery case 2 and the lid member 3, which are located ahead of the spot, to which the laser beam is applied by the first laser beam applying device 20a, in the laser welding forward direction X. With this configuration, it is possible to fill the clearance 10 between the battery case 2 and the lid member 3 with the material melted by the laser beam applied by the first laser beam applying device 20a, and to inhibit the laser beams applied by the second laser beam applying devices 20b from passing through the clearance 10 (i.e., avoid occurrence of laser beam penetration). As a result, even when the speed of laser welding is enhanced, occurrence of laser beam penetration is reliably avoided.

Preferably, the laser welding apparatus according to the first embodiment of the invention further includes the third laser beam applying devices 20c. The third laser beam applying devices 20c apply the additional laser beams S3 to spots on the battery case 2 and the lid member 3, which are located ahead of the spot to which the laser beam (main laser beam S1) is applied by the first laser beam applying device 20a, in the laser welding forward direction X, and which are located behind the spots to which the laser beams (sub-laser beams S2) are applied by the second laser beam applying devices 20b in the laser welding forward direction X. With this configuration, it is possible to sufficiently melt the material with the laser beams applied by the third laser beam applying devices 20c. This makes it possible to ensure a sufficient depth of fusion of the material at the welding portion while enhancing the speed of laser welding.

FIG. 10 illustrates a laser beam applying device according to a second embodiment of the invention. A laser beam applying device 30 according to the second embodiment illustrated in FIG. 10 includes a laser oscillator 21, a galvano scanner 22 and an optical fiber 23, and further includes a collimator lens 26 and a diffractive-optical element 31 (DOE). The collimator lens 26 and the diffractive-optical element 31 are disposed on the input side of the galvano scanner 22. An Fθ lens 24 and a protective lens 25 are disposed on the output side of the galvano scanner 22.

In the laser beam applying device 30, a laser beam flux is adjusted to parallel laser beams by the collimator lens 26, and then the parallel laser beams are passed through the diffractive-optical element 31. In this way, the laser beam applying device 30 adjusts the laser beam application pattern. In the laser beam applying device 30, the laser beams, which are obtained after the laser beam application pattern is adjusted by the diffractive-optical element 31, enter the galvano scanner 22.

In the laser beam applying device 30, as illustrated in FIG. 10, a ray of laser beam output from the single laser oscillator 21 is split into multiple rays of laser beams by passing through the collimator lens 26 and the diffractive-optical element 31, and the multiple rays of laser beams are applied to the welding portion (i.e., along the clearance 10) of the secondary battery 1 through the galvano scanner 22 and the Fθ lens 24.

The laser beam is split into the multiple laser beams corresponding to the main laser beam S1 and the sub-laser beams S2 by the diffractive-optical element 31. Thus, the single laser beam applying device 30 is able to fulfill the same function as that fulfilled by the first laser beam applying device 20a and the second laser beam applying device 20b.

As described above, the single laser beam applying device 30 is able to fulfill the same function as that fulfilled by multiple kinds of laser beam applying devices, that is, the laser beam applying devices 20a, 20b. This makes it possible to simplify the configuration of the laser welding apparatus and to achieve cost reduction. The diffractive-optical element 31 described above is capable of splitting a laser beam into multiple laser beams corresponding to the main laser beam S1 and the sub-laser beams S2. Further, it is also possible to allow the diffractive-optical element 31 to output laser beams corresponding to the additional laser beams S3 in addition to the laser beams corresponding to the main laser beam S1 and the sub-laser beams S2, by adjusting the configuration of the diffractive-optical element 31. That is, the single laser beam applying device 30 including one laser oscillator 21 and one diffractive-optical element 31 is able to fulfill the same function as that fulfilled by the three kinds of laser beam applying devices 20a, 20b, 20c.

That is, the laser welding apparatus according to the second embodiment of the invention includes the laser oscillator 21, which is a single laser beam source, and the diffractive-optical element 31, and the laser welding apparatus according to the second embodiment functions as both the first laser beam applying device 20a and the second laser beam applying device 20b in the first embodiment. That is, the first laser beam applying device 20a and the second laser beam applying device 20b in the first embodiment are integrated into the single laser beam applying device 30 in the second embodiment. This makes it possible to enhance the speed of laser welding with the simply-configured laser welding apparatus.

Preferably, the laser welding apparatus according to the second embodiment of the invention includes the laser oscillator 21, which is a single laser beam source, and the diffractive-optical element 31, and the laser welding apparatus according to the second embodiment functions as the first laser beam applying device 20a, the second laser beam applying device 20b, and the third laser beam applying device 20c. That is, the first laser beam applying device 20a, the second laser beam applying device 20b and the third laser beam applying device 20c in the first embodiment are integrated into the single laser beam applying device 30 in the second embodiment. This makes it possible to ensure a sufficient depth of fusion of the material at the welding portion with the simply-configured laser welding apparatus.

As described above, the laser welding apparatus according to the first embodiment of the invention includes the multiple laser beam applying devices 20. Alternatively, the laser welding apparatus according to the second embodiment of the invention includes the single laser beam applying device 30 including the diffractive-optical element 31, and is able to fulfill the same function as that fulfilled by the multiple laser beam applying devices 20.

Next, a variety of the laser beam application patterns formed by the laser welding apparatus and laser welding method according to the embodiment of the invention will be described with reference to FIG. 11A, FIG. 11B, FIG. 12A, FIG. 12B, FIG. 13A and FIG. 13B. Each of the laser beam application patterns described below may be be formed regardless of whether the configuration of the laser welding apparatus (more specifically, the configuration of the laser beam applying device) is the configuration including the multiple laser beam applying devices 20 or the configuration including the single laser beam applying device 30.

Figure 11A:
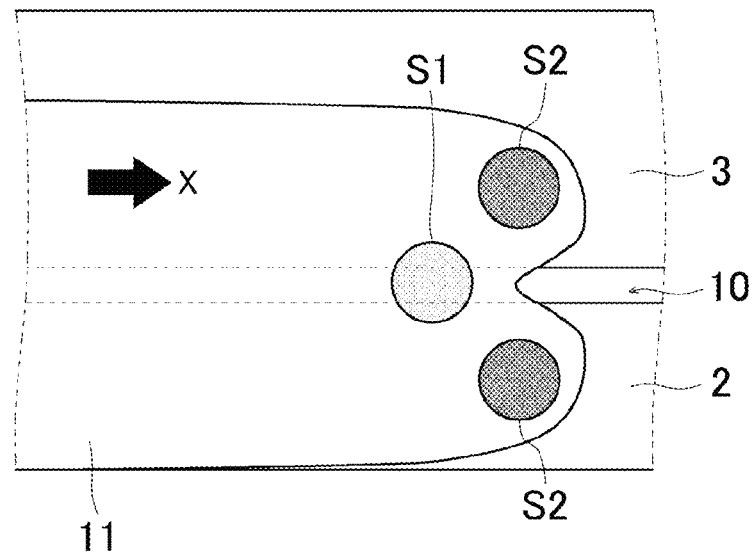
Figure 11B:
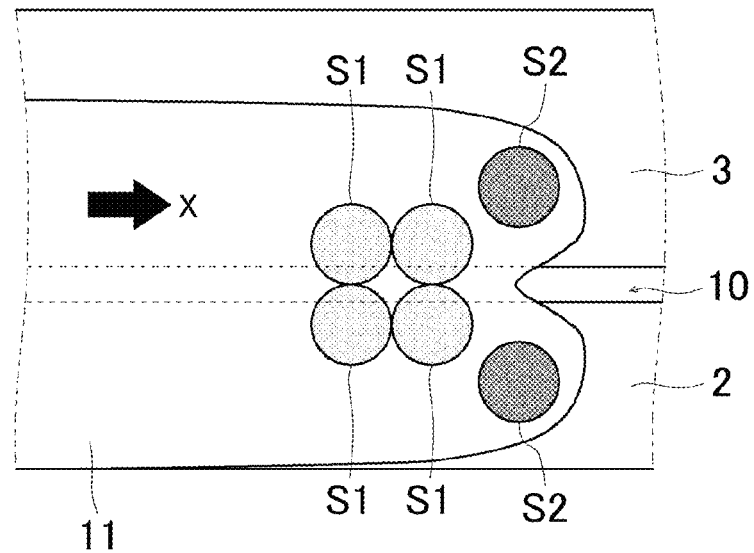

First, the case where the laser beam application pattern is Pattern 1 illustrated in FIG. 11A will be described. In Pattern 1 illustrated in FIG. 11A, the application spots of the sub-laser beams S2 are located on the battery case 2, which is an example of the first member, and the lid member 3, which is an example of the second member, and the application spot of the main laser beam S1 overlaps with the clearance 10. When the laser beam application pattern is Pattern 1, the sub-laser beams S2 are applied to spots on the battery case 2 and the lid member 3, which are located ahead of the application spot of the main laser beam S1 in the laser welding forward direction X, so that the application spots of the laser beams S1, S2 are located on a generally V-shape. This allows the molten material to flow more quickly into a portion of the clearance 10, which is located ahead of the application spot of the main laser beam S1 in the laser welding forward direction X. Thus, when Pattern 1 is employed, the scanning speed of the sub-laser beams S2 and the main laser beam S1 is enhanced, so that the speed of laser welding is enhanced.

In Pattern 1, the main laser beam S1 is applied to only one spot that overlaps with the clearance 10. Alternatively, as illustrated in Pattern 2 in FIG. 11B, the main laser beams S1 may be applied to multiple spots (four spots, in the embodiment). In this case, the scanning speed of the sub-laser beams S2 and the main laser beams S1 is higher than that in the case where Pattern 1 is employed. As a result, the speed of laser welding is further enhanced.

Figure 12A:
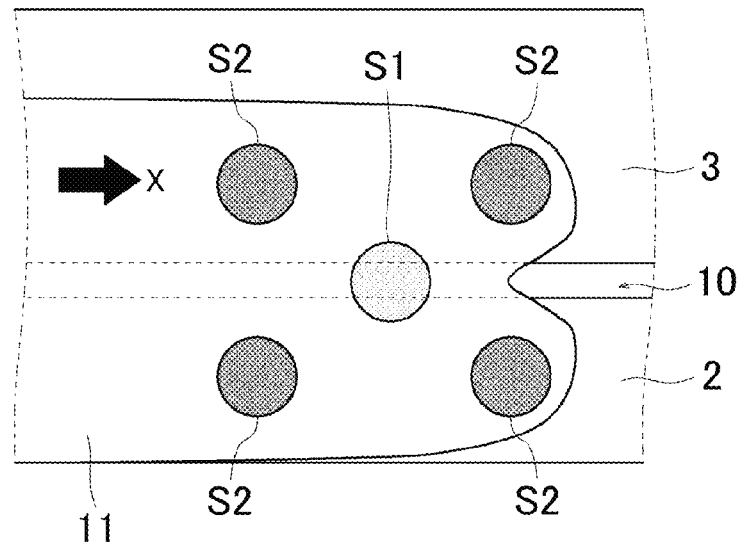
Figure 12B:
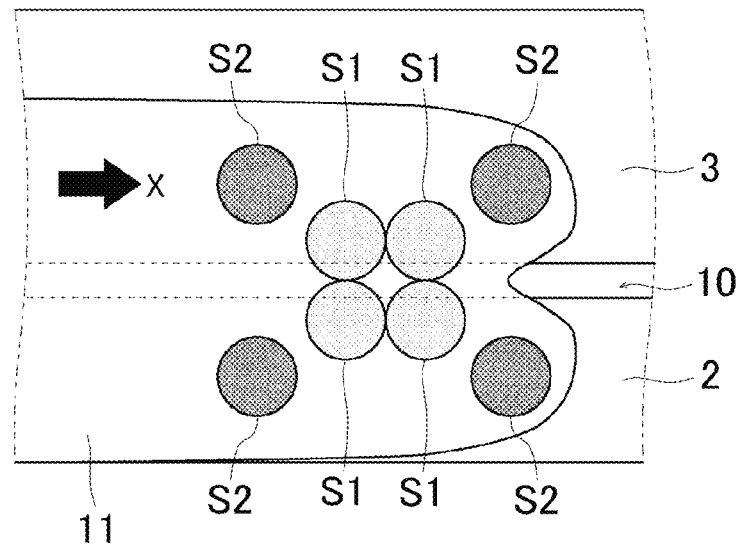

Next, the case where the laser beam application pattern is Pattern 3 illustrated in FIG. 12A will be described. In Pattern 3 illustrated in FIG. 12A, the application spots of the sub-laser beams S2 are located on the battery case 2, which is an example of the first member, and the lid member, which is an example of the second member, and the application spot of the main laser beam S1 overlaps with the clearance 10. In Pattern 3, the sub-laser beams S2 are applied to spots on the battery case 2 and the lid member 3, which are located ahead of the application spot of the main laser beam S1 in the laser welding forward direction X, and the sub-laser beams S2 are applied to spots on the battery case 2 and the lid member 3, which are located behind the application spot of the main laser beam S1 in the laser welding forward direction X, so that the application spots of the laser beams S1, S2 are located on a generally X-shape. This allows the molten material to flow quickly into a portion of the clearance 10, which is located ahead of the application spot of the main laser beam S1 in the laser welding forward direction X. In addition, it is possible keep heating the molten material with the sub-laser beams S2 applied to the spots behind the application spot of the main laser beam S1 in the laser welding forward direction X, even after the main laser beam S1 has passed. With this configuration, a sufficient amount of molten material reliably flows into the clearance 10, so that the welding quality is improved. That is, in Pattern 3, it is possible to improve the welding quality in laser welding while enhancing the speed of laser welding.

In Pattern 3, the main laser beam S1 is applied to only one spot that overlaps with the clearance 10. Alternatively, as illustrated in Pattern 4 in FIG. 12B, the main laser beams S1 may be applied to multiple spots (four spots, in the embodiment). In this case, the scanning speed of the sub-laser beams S2 and the main laser beams S1 is higher than that in the case where Pattern 3 is employed. As a result, the speed of laser welding is further enhanced.

Figure 13A:
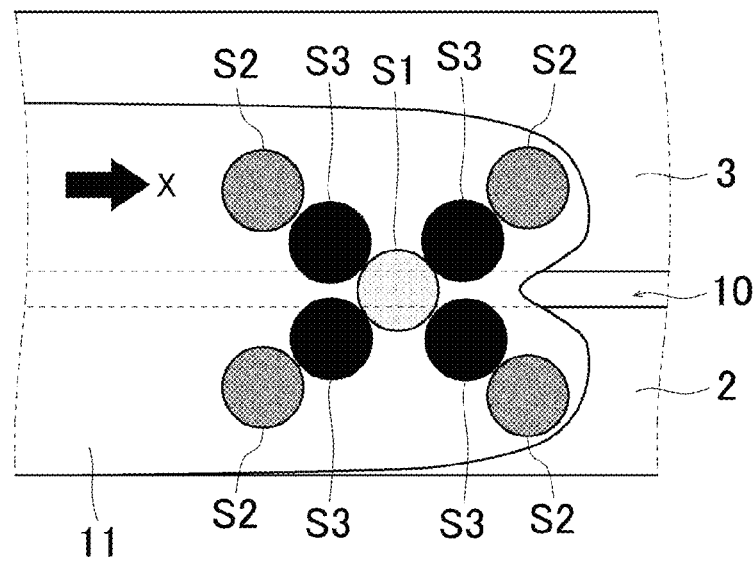
Figure 13B:
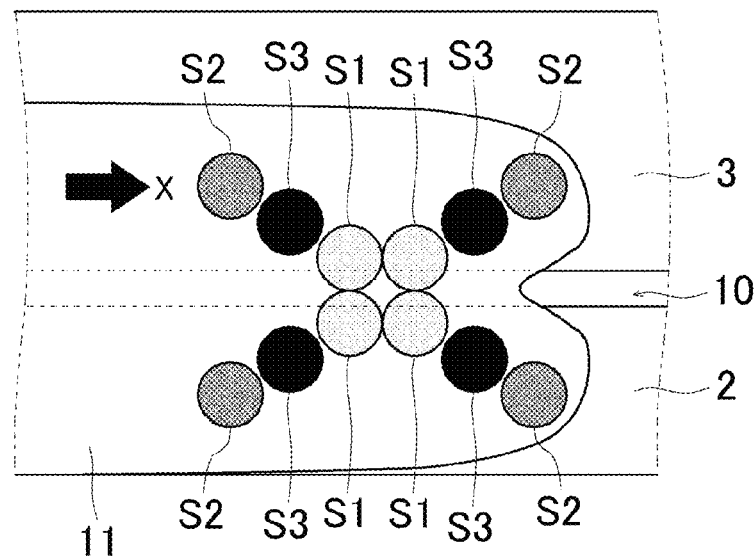

Next, the case where the laser beam application pattern is Pattern 5 illustrated in FIG. 13A will be described. In Pattern 5 illustrated in FIG. 13A, the application spots of the sub-laser beams S2 are located on the battery case 2 and the lid member 3, and the application spot of the main laser beam S1 overlaps with the clearance 10. More specifically, the sub-laser beams S2 are applied to spots on the battery case 2 and the lid member 3, which are located ahead of the application spot of the main laser beam S1 in the laser welding forward direction X, while the sub-laser beams S2 are also applied to spots on the battery case 2 and the lid member 3, which are located behind the application spot of the main laser beam S1 in the laser welding forward direction X, so that the application spots of the laser beams S1, S2 are located on a generally X-shape. In Pattern 5, the application spots of the additional laser beams S3 are located between the application spots of the sub-laser beams S2 and the main laser beam S1.

In Pattern 5, the main laser beam S1 is applied to only one spot that overlaps with the clearance 10. Alternatively, as illustrated in Pattern 6 in FIG. 13B, the main laser beams S1 may be applied to multiple spots (four spots, in the embodiment). In this case, the scanning speed of the sub-laser beams S2 and the main laser beams S1 is higher than that in the case where Pattern 5 is employed. As a result, the speed of laser welding is further enhanced.

With the laser welding apparatus and laser welding method according to the embodiment of the invention, application of the additional laser beams S3 to the spots between the application spots of the sub-laser beams S2 and the main laser beam S1 shortens the time required to melt the material, so that the speed of laser welding is further enhanced. In addition, a sufficient depth of fusion is ensured, so that the welding quality is further improved.

Figure 15A:
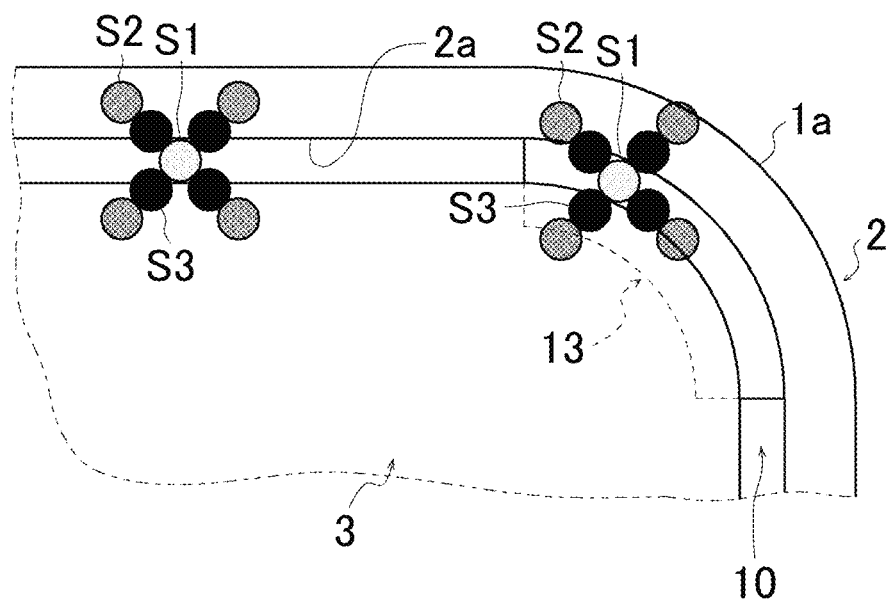

Next, the laser welding method according to the embodiment of the invention will be described with reference to FIG. 14 to FIG. 16. The laser welding method according to the embodiment of the invention is a method for joining a first member and a second member together by laser welding. In the embodiment, as illustrated in FIG. 14, a generally rectangular laser beam application portion, which extends along the generally rectangular clearance 10 formed between the open portion 2a of the battery case 2 and the lid member 3, is scanned with laser beams, so that the lid member 3 is joined to the open portion 2a by laser welding. In the laser welding method, the laser welding start position coincides with the laser welding end position, so that the rectangular endless bead 11 is formed. Note that, the case where laser welding is performed by the laser welding apparatus according to the second embodiment, which includes the diffractive-optical element 31, will be described below.

In the laser welding method according to the embodiment of the invention, any one of Pattern 1 to Pattern 6 described above may be selected. For example, when any one of Pattern 1 to Pattern 4 is selected, the laser welding method according to the embodiment of the invention includes a first laser beam application step of applying the main laser beam S1 and a second laser beam application step of applying the sub-laser beams S2.

With the laser welding method according to the embodiment of the invention, which includes the first laser beam application step of applying the main laser beam S1 and the second laser beam application step of applying the sub-laser beams S2, it is possible to reliably inhibit occurrence of laser beam penetration and enhance the speed of laser welding.

When either Pattern 5 or Pattern 6 is selected, the laser welding method according to the embodiment of the invention further includes a third laser beam application step of applying the additional laser beams S3, in addition to the first laser beam application step of applying the main laser beam S1 and the second laser beam application step of applying he sub-laser beams S2.

With the laser welding method according to the embodiment of the invention, which includes the third laser beam application step of applying the additional laser beams S3, in addition to the first laser beam application step of applying the main laser beam S1 and the second laser beam application step of applying the sub-laser beams S2, it is possible to reliably inhibit occurrence of laser beam penetration and enhance the speed of laser welding, as well as to improve the welding quality.

More specifically, the laser welding method for joining the battery case 2, which is an example of the first member, and the lid member 3, which is an example of the second member, together by laser welding includes: the first laser beam application step of applying the laser beam (main laser beam S1) to the border area between the battery case 2 and the lid member 3; and the second laser beam application step of applying the laser beams (sub-laser beams S1) to spots on the battery case 2 and the lid member 3, which are located ahead of the spot, to which the main laser beam S1 is applied in the first laser beam application step, in the laser welding forward direction. Thus, it is possible to inhibit the laser beam applied in the first laser beam application step from passing through the clearance 10 (i.e., laser beam penetration) by filling the clearance 10 between the battery case 2 and the lid member 3 with the material melted in the second laser beam application step. As a result, it is possible to reliably inhibit occurrence of laser beam penetration even when the speed of laser welding is increased.

Preferably, the laser welding method according to the embodiment of the invention further includes the third laser beam application step of applying the laser beams (additional laser beams S3) to spots on the battery case 2 and the lid member 3, which are located ahead of the spot, to which the laser beam (main laser beam S1) is applied in the first laser beam application step, in the laser welding forward direction X, and which are located behind the spots, to which the laser beams (sub-laser beams S2) are applied in the second laser beam application step, in the laser welding forward direction X. Thus, it is possible to sufficiently melt the material in the third laser beam application step. As a result, it is possible to ensure a sufficient depth of fusion of the material at the welding portion while enhancing the speed of laser welding.

The case where laser welding is performed on a workpiece, such as the secondary battery 1, which has the corner portions 1a will be described below. In the laser welding method according to the embodiment of the invention, when laser welding is performed on the battery case 2 and the lid member 3 at the corner portion 1a, the laser welding forward direction X is turned 90 degrees without rotating the laser beam application pattern formed by the laser welding apparatus along the rounded shape (i.e., without rotating the laser beam applying device 30), as illustrated in FIG. 15A. This laser welding method is particularly effective when the laser beam application pattern is configured to be symmetric with respect to a line extending in the laser welding forward direction and to be symmetric with respect to a line perpendicular to the line extending in the laser welding forward direction, as in Pattern 3 to Pattern 6 illustrated in FIGS. 12A, 12B and FIGS. 13A, 13B. More specifically, the laser beam application pattern is configured to be symmetric with respect to a line extending in the laser welding forward direction and passing through the center of the laser beam application pattern and to be symmetric with respect to a line passing through the center of the laser beam application pattern and perpendicular to the line extending in the laser welding forward direction, as in Pattern 3 to Pattern 6 illustrated in FIGS. 12A, 12B and FIGS. 13A, 13B.

If the laser beam applying device 30 needs to be rotated when laser welding performed on the corner portion 1a, it is necessary to synchronize the rotary motion and the shifting motion of the laser beam applying device 30. This may hinder the enhancement of laser welding.

On the other hand, in the laser welding method according to the embodiment of the invention, the laser beam applying device 30 is shifted in the laser welding forward direction X without being rotated. Thus, it is not necessary to reduce the shifting speed of the laser beam applying device 30 when laser welding is performed on the corner portion 1a. This contributes to the enhancement of the speed of laser welding.

In the laser welding method according to the embodiment of the invention, when there is a portion on which laser welding is performed while the laser welding forward direction is turned 90 degrees, that is, when laser welding is performed on the corner portion, an application pattern of the laser beam (main laser beam S1) in the first laser beam application step and the laser beams (sub-laser beams S2) in the second laser beam application step (Pattern 3, Pattern 4), or an application pattern of the laser beam (main laser beam S1) in the first laser beam application step, the laser beams (sub-laser beams S2) in the second laser beam application step and the laser beams (additional laser beams S3) in the third laser beam application step (Pattern 5, Pattern 6) is configured to be symmetric with respect to a line extending in the laser welding forward direction and to be symmetric with respect to a line perpendicular to the line extending in the laser welding forward direction. More specifically, each of the above-described application pattern is configured to be symmetric with respect to a line extending in the laser welding forward direction and passing through the center of the laser beam application pattern and to be symmetric with respect to a line passing through the center of the laser beam application pattern and perpendicular to the line extending in the laser welding forward direction. Thus, the speed of laser welding is enhanced with the simple laser welding method.

Figure 15B:
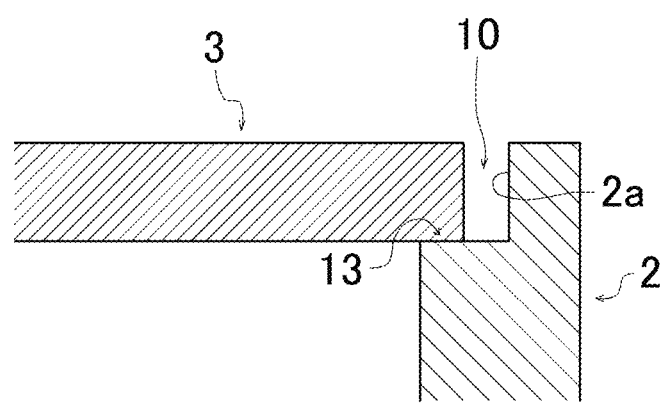

In the laser welding method according to the embodiment, laser welding is performed with a support portion 13 disposed at each corner portion 1a in order to avoid occurrence of laser beam penetration when the laser beams are applied to the corner portion 1a, as illustrated in FIG. 15A and FIG. 15B.

The support portion 13 protrudes inward from the inner face of the battery case 2 by an amount (height or thickness) equal to or greater than the width of the clearance 10. The support portion 13 is disposed so as to seal the clearance 10 at least at the corner portion 1a. In the case where the laser beam application pattern includes the sub-laser beams S2 ahead of the main laser beam S1 in the laser welding forward direction X, as the application spots proceed through the corner portion 1a, the sub-laser beams S2 ahead of the main laser beam S1 traverses the clearance 10 without fail as illustrated in FIG. 15A. This may result in occurrence of laser beam penetration at the corner portion 1a. However, when the clearance 10 at the corner portion 1a is sealed from below with the support portion 13, the laser beams that enter the clearance 10 impinge on the support portion 13, so that laser beam penetration at the corner portion 1a is inhibited easily and reliably.

The support portion 13 is suitable as a portion to be selected as the starting point of laser welding. When there is no support portion 13, the starting point of laser welding needs to be selected from the battery case 2 and the lid member 3. In this case, the main laser beam S1 proceeds along the clearance 10 after the clearance 10 is sealed with a molten portion of the battery case 2 or the lid member 3, which is selected as the starting point.

On the other hand, when the support portion 13 is provided, it is not necessary to select the battery case 2 or the lid member 3 as the starting point of laser welding, and it is possible to apply the main laser beam S1 onto the clearance 10 from the beginning of laser welding. The laser beams are applied to the support portion 13 located below the clearance 10 to melt the battery case 2 and the lid member 3 around the clearance 10. Then, laser welding proceeds along the clearance 10. Thus, when the support portion 13 is provided, the moving distance of the laser beam applying device 30 is reduced. This contributes to the enhancement of the speed of laser welding.

Figure 16A:
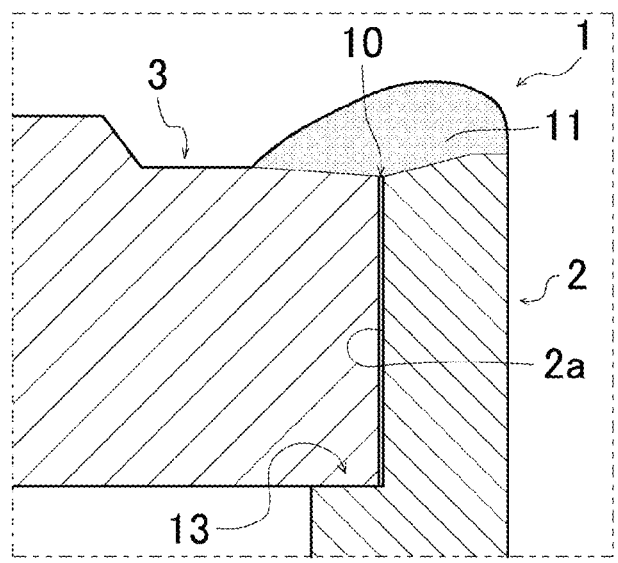
Figure 16B:
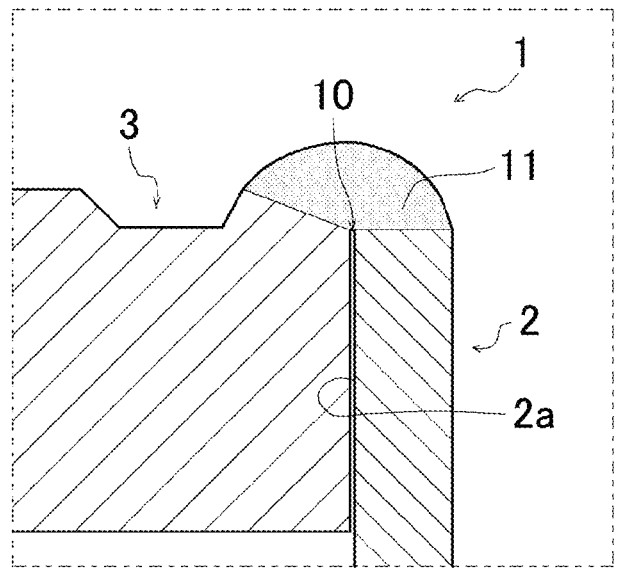

The support portion 13 may be formed in various forms. For example, as illustrated in FIG. 16A, the support portion 13 may be formed by forming a step in the wall surface of the battery case 2 at each corner portion 1a. Alternatively, the support portion 13 may be formed by providing a member that protrudes inward from the wall surface of the battery case 2 at each corner portion 1a.

In the laser welding method according to the embodiment of the invention, in a case where the lid member 3 is welded to the open portion 2a of the battery case 2 to seal the open portion 2a, the support portion 13 that supports the lid member 3 while sealing the clearance 10 between the battery case 2 and the lid member 3 is provided at least at each corner portion 1a. This configuration makes it possible to reliably inhibit occurrence of laser beam penetration at the corner portion 1a.

What is claimed is:
1. A laser welding apparatus for joining a first member and a second member together by laser welding, the laser welding apparatus comprising:
a first laser beam applying device that applies a first laser beam to a border area between the first member and the second member; and a second laser beam applying device that applies a second laser beam to a second laser beam application spot of each of the first member and the second member, the second laser beam application spot being located ahead of a first laser beam application spot to which the first laser beam is applied by the first laser beam applying device, in a laser welding forward direction, wherein the second laser beam application spot to which the second laser beam is applied by the second laser beam applying device is distanced from the border area to which the first laser beam is applied by the first laser beam applying device.

2. The laser welding apparatus according to claim 1, further comprising a third laser beam applying device that applies a laser beam to a third laser beam application spot of each of the first member and the second member, the third laser beam application spot being located ahead of the first laser beam application spot to which the laser beam is applied by the first laser beam applying device, in the laser welding forward direction, and being located behind the second laser beam application spot to which the laser beam is applied by the second laser beam applying device, in the laser welding forward direction.

3. The laser welding apparatus according to claim 1, further comprising:
 a single laser beam source; and
 a diffractive-optical element,
 wherein the first laser beam applying device and the second laser beam applying device are integrated into a single laser beam applying device that serves as both the first laser beam applying device and the second laser beam applying device due to provision of the single laser beam source and the diffractive-optical element.

4. The laser welding apparatus according to claim 2, further comprising:
 a single laser beam source; and
 a diffractive-optical element,
 wherein the first laser beam applying device, the second laser beam applying device and the third laser beam applying device are integrated into a single laser beam applying device that serves as the first laser beam applying device, the second laser beam applying device and the third laser beam applying device due to provision of the single laser beam source and the diffractive-optical element.

5. A laser welding method for joining a first member and a second member together by laser welding, the laser welding method comprising:
 a first laser beam application step of applying a first laser beam to a border area between the first member and the second member; and
 a second laser beam application step of applying a second laser beam to a second laser beam application spot of each of the first member and the second member, the laser beam application spot being located ahead of a first laser beam application spot to which the first laser beam is applied in the first laser beam application step, in a laser welding forward direction,
 wherein the second laser beam application spot is distanced from the border area.

6. The laser welding method according to claim 5, wherein when there is a portion on which laser welding is performed while the laser welding forward direction is turned 90 degrees, an application pattern of the first laser beam in the first laser beam application step and the second laser beam in the second laser beam application step is configured to be symmetric with respect to a line extending in the laser welding forward direction and to be symmetric with respect to a line perpendicular to the line extending in the laser welding forward direction.

7. The laser welding method according to claim 5, further comprising a third laser beam application step of applying a third laser beam to a third laser beam application spot of each of the first member and the second member, the third laser beam application spot being located ahead of the first laser beam application spot to which the laser beam is applied in the first laser beam application step, in the laser welding forward direction, and being located behind the second laser beam application spot to which the laser beam is applied by the second laser beam application step, in the laser welding forward direction.

8. The laser welding method according to claim 7, wherein when there is a portion on which laser welding is performed while the laser welding forward direction is turned 90 degrees, an application pattern of the first laser beam in the first laser beam application step, the second laser beam in the second laser beam application step, and the third laser beam in the third laser beam application step is configured to be symmetric with respect to a line extending in the laser welding forward direction and to be symmetric with respect to a line perpendicular to the line extending in the laser welding forward direction.

9. The laser welding method according to claim 5, wherein:
 the first member is a battery case and the second member is a lid member, and
 in a case where the lid member is welded to an open portion of the battery case to seal the open portion, at least a corner portion of the open portion is provided with a support portion that supports the lid member while sealing a clearance between the battery case and the lid member.

* * * * *